United States Patent [19]
FFowces-Williams et al.

[11] 3,743,185
[45] July 3, 1973

[54] NOISE SUPPRESSOR FOR JET ENGINES

[75] Inventors: John Eirwyn FFowces-Williams, Surrey; Roy Hawkins, Bristol; Hylton Dawson, Bristol; William Smith, Yate, Bristol, all of England

[73] Assignee: Secretary of State Defence in Her Britannic Majesty's Goverment of the United Kingdom of Great Britain and Northern Ireland, London, England

[22] Filed: Nov. 23, 1971

[21] Appl. No.: 201,375

[30] Foreign Application Priority Data
Nov. 30, 1970 Great Britain...................... 5,688/70
Nov. 26, 1970 Great Britain...................... 3,234/70

[52] U.S. Cl. ....................... 239/265.27, 239/265.35
[51] Int. Cl. ............................................. B64c 15/04
[58] Field of Search................. 239/265.11, 265.13, 239/265.19, 265.27, 265.25, 265.35, 265.33; 181/33 HC, 33 HD

[56] References Cited
UNITED STATES PATENTS
2,914,916  12/1959  Gelin et al. .................... 239/265.17
3,612,399  10/1971  Rodgers et al. ................ 239/265.19
3,095,697  7/1963   Reinhart ..................... 239/265.13 X
2,975,593  3/1961   Bauger et al................... 239/265.27
3,153,319  10/1964  Young et al. .................. 239/265.19
3,344,882  10/1967  Bellion et al............... 239/265.13 X FOREIGN PATENTS OR APPLICATIONS
1,301,341  8/1969  Germany........................ 181/33 HC Primary Examiner—M. Henson Wood, Jr.
Assistant Examiner—John J. Love
Attorney—Richard K. Stevens, Davidson C. Miller et al.

[57] ABSTRACT

The disclosure of this invention pertains to an exhaust nozzle for jet engines wherein the nozzle has a generally circular outlet opening defined by an edge lying in a plane normal to the nozzle axis except at two diametrically opposite localities at each of which the edge defines a recess where the nozzle is laterally open to the ambient air. The presence of the recesses causes the jet to spread in the plane of the recesses with the effect of sound suppression in that plane.

5 Claims, 9 Drawing Figures

Patented July 3, 1973

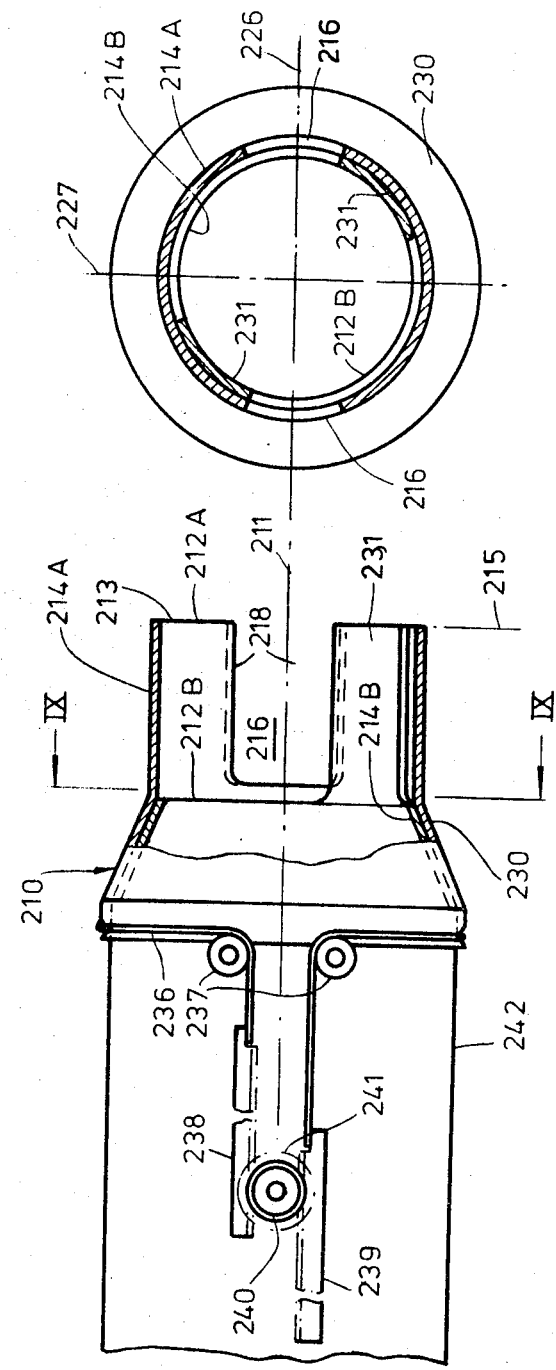

NOISE SUPPRESSOR FOR JET ENGINES

This invention relates to noise suppressors for jet engines and is concerned with the suppression of jet noise.

It is an object of this invention to provide improved means for suppressing jet noise in a selected axis plane of the nozzle generating the jet. The need for this arises, for example, during the take-off of a jet propelled aircraft when, while the aircraft is at ground level, only the jet noise emanating in the direction parallel to the ground disturbs persons in the vicinity of the aircraft; noise emanated in the vertical direction is of relatively lesser significance in this situation.

According to this invention there is provided an exhaust nozzle for jet engine, comprising a duct having an edge defining the discharge opening of the duct, the duct being dimensioned for the edge to lie in a plane transverse to the longitudinal axis of the duct except at two locations situated at opposite sides of said axis where the duct is dimensioned for the edge to define recesses at which the duct is open to ambient air in a direction laterally of said axis.

When operating the nozzle at a pressure ratio greater than 1:1, preferably greater than 2:1, the presence of the recesses causes the jet flow to spread at said opposite sides while remaining relatively undisturbed at the remaining sides.

An observer facing the edges of the spread jet experiences a lesser sound pressure level than that emitted by a jet from a comparable nozzle not having said recesses.

Examples of this invention will now be described with reference to the accompanying drawings wherein:

FIG. 8 is a part sectional side elevation of a nozzle according to a third example.

FIG. 9 is a section on the line IX — IX in FIG. 8.

Figure 1:
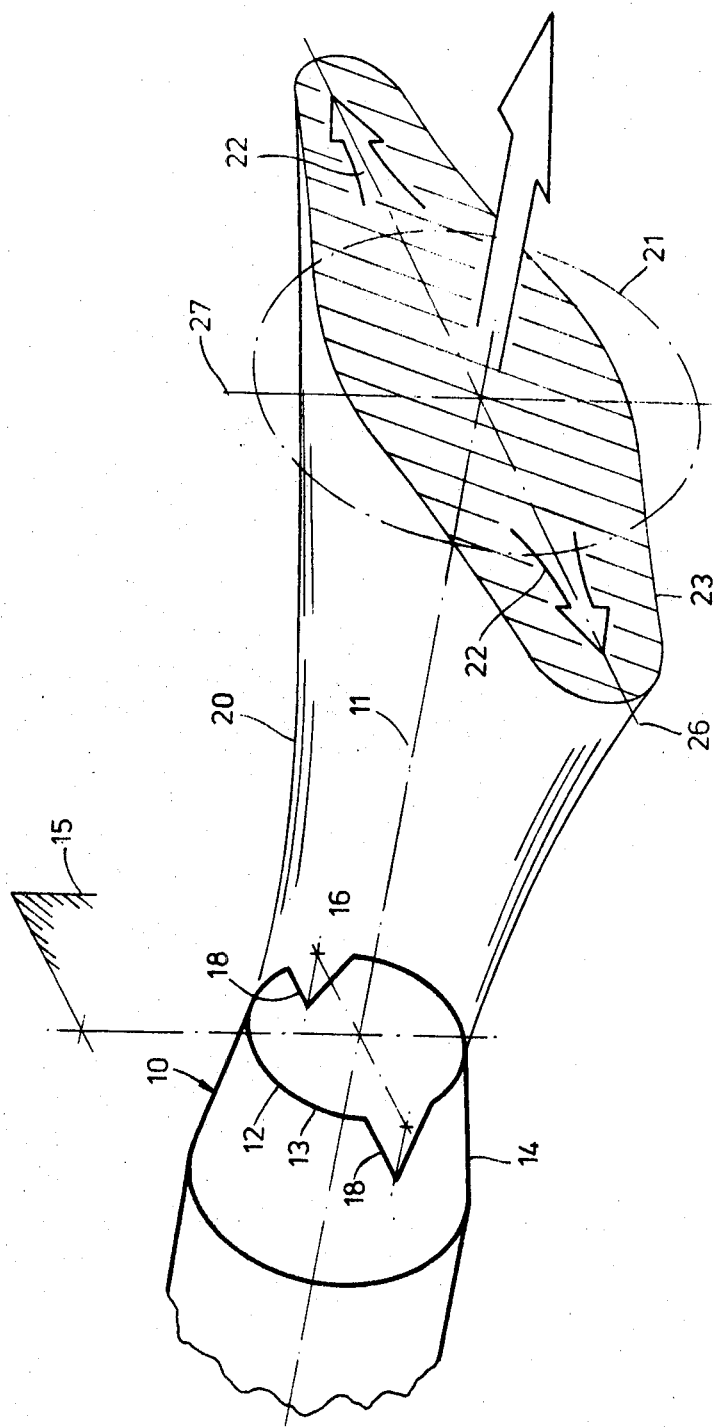
FIG. 1 is a perspective view of a jet nozzle according to a first example.

Referring to FIG. 1, there is shown a jet nozzle 10 for gas turbine engine (not shown). The nozzle comprises a convergent annular duct 14 ending at an edge 12 defining the discharge opening or throat. The edge 12 has parts 13 lying in a plane 15 normal to an axis 11 being the axis of the duct, i.e., the axis defining the mean direction of flow through the nozzle. The edge 12 further includes parts 18 shaped to define two recesses 16 situated at diametrically opposite sides of the axis 11 and at which the duct 14 is open to the ambient air. If the nozzle has the usual circular throat the flow of a jet 20 from the nozzle retains a generally circular cross-section 21. However, the presence of the recesses 16 causes the jet to have component motions 22,22 away from the axis 11 and in the plane 26 of the diameter on which the recesses are situated. In consequence the jet is deformed away from the circular shape into a shape 23 in which it is widened in the plane 26 and to a relatively smaller extent narrowed in the plane 27 perpendicular thereto. The amount of deformation increases with the distance from the throat.

The deformation of the jet in the manner described has the consequence that the jet noise in the plane 26 is less than the noise emitted by a jet from a comparable nozzle having a throat which is not recessed. Generally the noise attenuation increases with the extent of the deformation, and the latter increases with the size of the recesses and with the pressure ratio of the nozzle, i.e., the pressure drop across the area bounded by the edge 12. The pressure drop is necessary for the establishment of the lateral component motions 22 and a pressure ratio of 1:1 is not sufficient for this. The deformation of the jet is accompanied by some loss in the axial thrust of the engine. The size of the recesses is therefor a matter of finding an acceptable compromise between noise attenuation and thrust loss.

Figure 3:
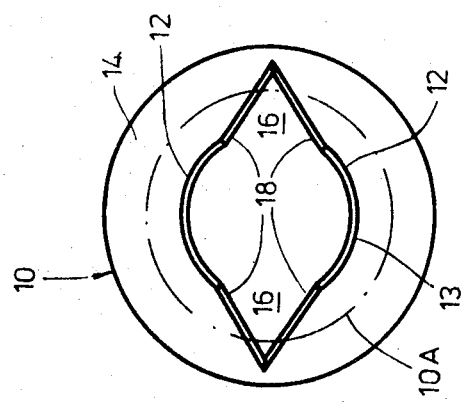
FIG. 3 is an end view of FIG. 2.
Figure 2:
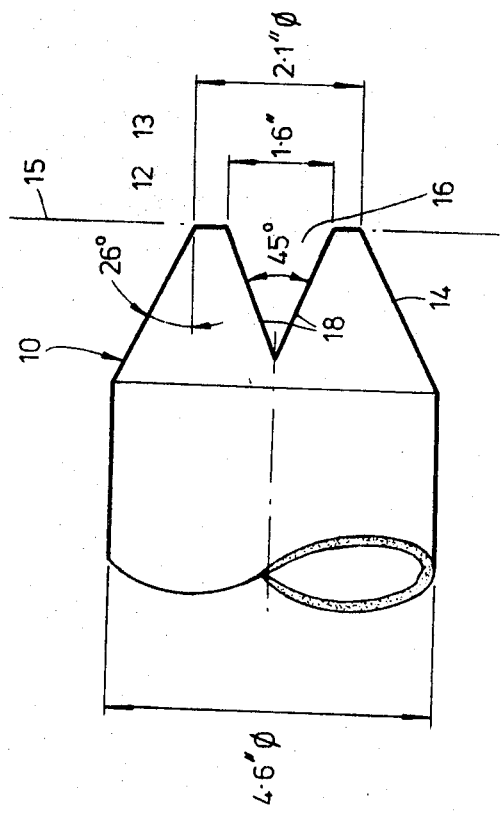
FIG. 2 is a side elevation of the nozzle.
Figure 5:
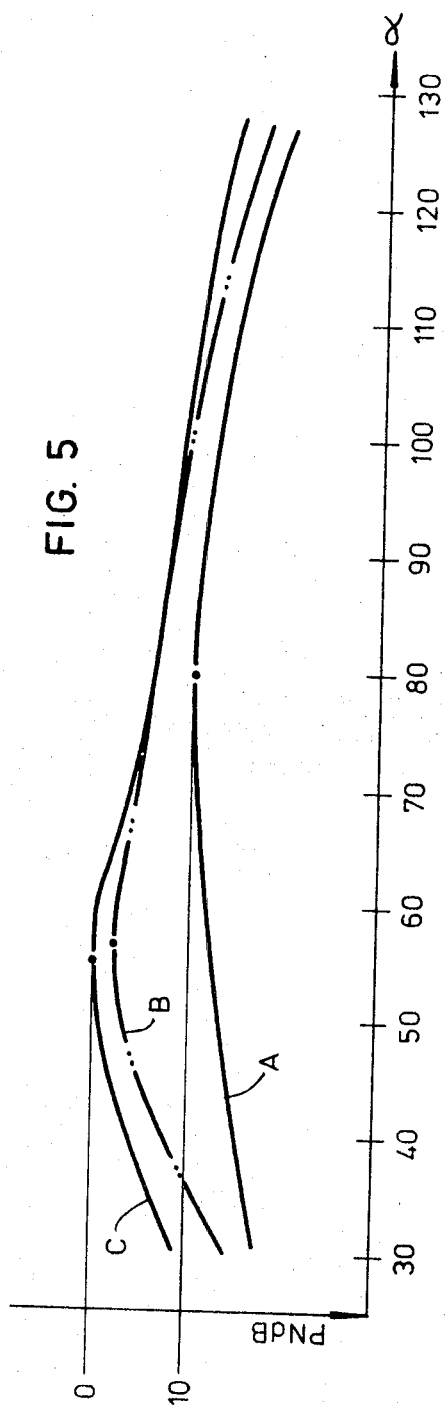
FIG. 5 is a diagram of the jet noise characteristics of the nozzle.
Figure 4:
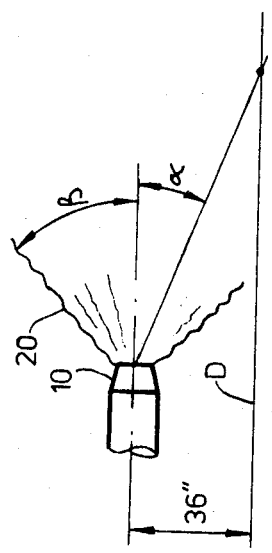
FIG. 4 is a diagram for explaining the manner of measuring the noise of the jet from the nozzle.

In an experimental result a reduction of about 10 PNdB was achieved against a thrust loss of about 5 percent. The experimental nozzle, illustrated in FIG. 2 and 3, has the dimensions shown and was operated at a pressure ratio of 3.25:1 and a gas temperature of 1,100°K. The noise was measured in the usual manner at points spaced along a line D parallel to the nozzle axis, as shown in FIG. 4, the distance of any one point from the nozzle being given in terms of the angle $\alpha$. The noise measurements are plotted as shown in FIG. 5 where the curves A, B and C relate respectively to the noise levels in the planes 26,27 and the noise levels of a comparable datum nozzle whose throat is not recessed. The datum nozzle, whose throat is shown at 10A on FIG. 3, was "comparable" in the sense that it had the same mass flow, pressure ratio and gas temperature as the nozzle 10. This equivalence occurs if the throat area of the datum nozzle is approximately the same as the projected area, as seen in FIG. 3, of the nozzle 10.

It will be seen that the highest noise level in plane 26 (curve A) was significantly less than that of the datum nozzle. The highest noise levels in plane 27 (curve B) was relatively high and may in fact by above the curve C so that it may be said that the total radiated noise power of nozzle 10 is not significantly different from that of the datum nozzle. The spreading of the jet occured at an angle $\beta$ (FIG. 4) of 40° to 45°.

Figure 7:
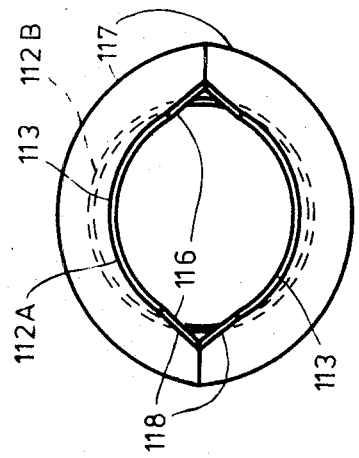
FIG. 7 is an end view of FIG. 6.
Figure 6:
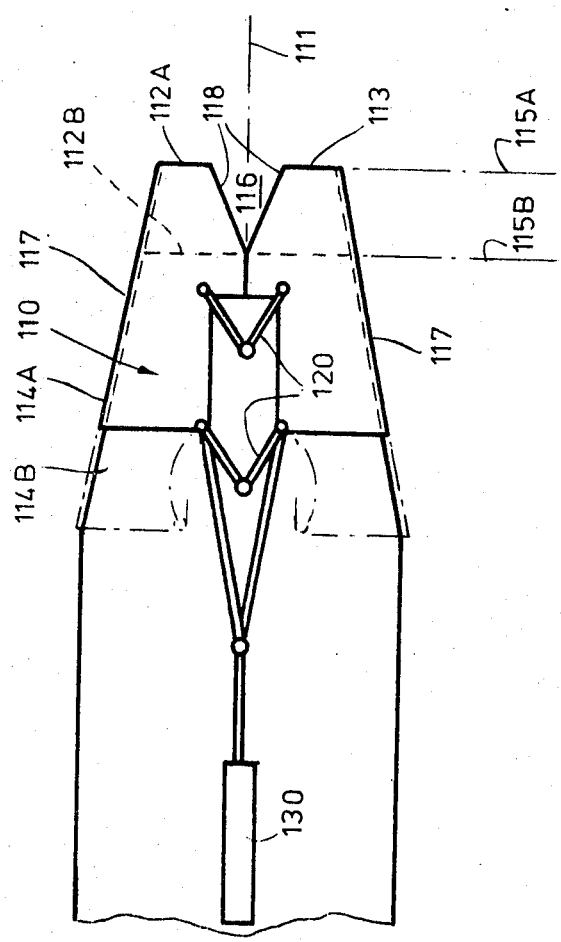
FIG. 6 is a side elevation of a nozzle according to a second example.

Referring to FIG. 6 and 7, there is shown a nozzle 110 comprising a first duct portion 114A ending at an edge 112A and a second duct portion 114B ending at an edge 112B lying upstream of the edge 112A and wholly in a plane 115B transverse to the axis 111 of the nozzle. The edge 112A has parts 113 lying in a plane 115A transverse to the axis 111 and parts 118 forming two diametrically opposite recesses 116 similar to the recesses 16 of the nozzle 10.

The duct portion 114A comprises two members 117 supported by links 120 for movement between the operative position shown in full lines and an inoperative position shown in broken lines. The members 117 are shaped so that when they are in the operative position they form the edge 112A, including the recesses 116, between them, and in this position the portion 114A constitutes a downstream extension of the portion 114B and the edge 112A constitutes the controlling discharge opening of the nozzle.

The movement of the member 117 is effected by pneumatic motors 130 (only one shown) and during movement from the operative position the links 120 cause the members 117 to move with a motion having a component laterally away from the axis 111 to bring the members clear of the edge 112B in the sense of not influencing flow from the latter edge. The movement also has a longitudinal component and at the end of the movement the edge parts 113 lie in the plane 115B of the edge 112B and the latter is then the controlling discharge opening of the nozzle. The inoperative position is adopted when thrust is more important than noise suppression, e.g., during cruise, as distinct from take-off of the aircraft.

It is desirable that the flow areas of the edges 112A and 112B should be the same so as not to change the nozzle pressure ratio when changing from one mode of operation to the other. It will be seen that by virtue of the convergence of the ducts 114A,114B it is possible to satisfy this condition.

Referring to FIGS. 8 and 9, there is shown a nozzle 210 comprising a first duct portion or shroud 214A being a cylinder having an edge 212A parts 213 of which lie in a plane 215 transverse to the axis 211 of the nozzle and other parts 218 of which form two diametrically opposite recesses 216. The portion 214A is supported by a part 230 surrounding a second duct portion 214B which is convergent and coaxial with the shroud 214A. The portion 214B has a discharge opening constituted by an edge 212B.

The portion 214A is supported by the portion 214B for rotation about the axis 211 so that the recesses 216 can be moved through a range of 90° between planes 226 and 227 (FIG. 9) for the purpose, for example, of changing from noise suppression in a horizontal plane during the ground roll part of an aircraft take-off to noise suppression in a vertical plane during low level overflight of built-up areas adjacent the air field.

The portion 214B has two extensions 231 positioned to close the recesses 216 if the portion 214A is rotated beyond said 90° range and thereby to make the noise suppressor inoperative.

The discharge opening of the nozzle 210 is constituted essentially by the edge 212B. It will clear that the area of this opening does not change during rotation of the portion 214A between positions when the recesses 216 are respectively open and closed because the diameter of the portion 214A is uniform over its length.

Rotation of the portion 214A is effected by a flexible cable 236 which is wrapped around the part 230 and locally secured thereto. The ends of the cable are lead over pulleys 237 and secured to racks 238,239 meshing with a pinion 240 driven by a pneumatic motor 241. The arrangement of the pulleys racks, pinion and motor is supported on a jet pipe 242 which connects the nozzle to an engine (not shown).

The portion 214A should not be longer axially than is necessary for accommodating the recesses 216 in a position downstream of the edge 212B as otherwise there would be a loss of the gas pressure necessary for the effectiveness of the recesses 216 in flattening the jet.

What I claim is

1. An exhaust nozzle for a jet engine, comprising:

a first duct portion having an edge defining the discharge opening of said nozzle, said edge lying in a plane substantially normal to the longitudinal axis of said nozzle;

first and second opposed recessed portions formed in said edge of said first duct portion for spreading a portion of the stream of outlet gas passing through the nozzle substantially laterally of the main stream;

a second duct portion coaxial with said first duct portion; and means for rotating said first and second duct portions relative to each other to rotate the plane of the laterally spread portion of said stream of outlet gas through a predetermined angle.

2. The exhaust nozzle as defined in claim 1, wherein said second duct portion comprises first and second members extending substantially parallel to the longitudinal axis of said nozzle, said first and second members cooperating with said first duct portion to close the openings formed by said recessed portions when said first and second duct portions have been rotated through a further predetermined angle relative to each other.

3. The nozzle as defined in clam 1, wherein the plane of said laterally spread portion is rotatable by the relative rotation of said first and second duct portions through an angle of approximately 90°.

4. The exhaust nozzle as defined in claim 1, wherein said second duct portion is located upstream of said first duct portion.

5. Nozzle according to claim 1 wherein said second duct portion is convergent and has at its small area end an edge defining a discharge opening, said first duct portion is of uniform flow area and extends downstream of the discharge opening of the second duct portion.

* * * * *